(12) United States Patent
Ganguly et al.

(10) Patent No.: US 11,064,142 B1
(45) Date of Patent: Jul. 13, 2021

(54) IMAGING SYSTEM WITH A DIGITAL CONVERSION CIRCUIT FOR GENERATING A DIGITAL CORRELATED SIGNAL SAMPLE AND RELATED IMAGING METHOD

(71) Applicant: Varex Imaging Corporation, Salt Lake City, UT (US)

(72) Inventors: Arundhuti Ganguly, San Jose, CA (US); Gerhard P. Roos, Sandy, UT (US); Ivan Mollov, Mountain View, CA (US)

(73) Assignee: Varex Imaging Corporation, Salt Lake City, UT (US)

( * ) Notice: Subject to any disclaimer, the term of this patent is extended or adjusted under 35 U.S.C. 154(b) by 0 days.

(21) Appl. No.: 16/184,025

(22) Filed: Nov. 8, 2018

Related U.S. Application Data

(63) Continuation-in-part of application No. 15/872,986, filed on Jan. 16, 2018, now abandoned, which is a
(Continued)

(51) Int. Cl.
*H04N 5/363* (2011.01)
*H04N 5/357* (2011.01)
(Continued)

(52) U.S. Cl.
CPC ............ *H04N 5/363* (2013.01); *H04N 5/359* (2013.01); *H04N 5/3559* (2013.01);
(Continued)

(58) Field of Classification Search
CPC ......... H01L 27/146–14893; H04N 5/335–378; H04N 5/3745–37455; H04N 5/3355
(Continued)

(56) References Cited

U.S. PATENT DOCUMENTS

| 4,139,784 A | 2/1979 | Sauer |
| RE31,612 E | 6/1984 | Sauer |

(Continued)

FOREIGN PATENT DOCUMENTS

| EP | 2512125 | 10/2012 |
| EP | 2294455 | 7/2015 |

(Continued)

OTHER PUBLICATIONS

EP 14843722.1, Supplementary Partial European Search Report, dated Mar. 23, 2017.
(Continued)

*Primary Examiner* — Xi Wang
(74) *Attorney, Agent, or Firm* — Laurence & Phillips IP Law

(57) ABSTRACT

An example imaging system includes a digital conversion circuit and a plurality of pixel circuits each having a photodiode, a biasing circuit, a charge-to-voltage converter, and a switch. The photodiode is configured to generate charges in response to light or radiation. The biasing circuit includes an operational amplifier having an input signal port for receiving a bias reference signal which controls a bias current flowing through an internal circuit of the operational amplifier. The charge-to-voltage converter is configured to accumulate the charges drained by the biasing circuit and convert the accumulated charges into a corresponding output voltage. The switch configured to selectively couple the charge-to-voltage converter to at least one data line. The digital conversion circuit is configured to generate a digital correlated signal sample for each pixel circuit using a difference between a digital signal sample and a digital reset level sample.

19 Claims, 11 Drawing Sheets

Related U.S. Application Data continuation-in-part of application No. 15/798,393, filed on Oct. 30, 2017, now abandoned, which is a continuation-in-part of application No. 15/176,355, filed on Jun. 8, 2016, now Pat. No. 9,807,323, which is a continuation of application No. 14/418,955, filed as application No. PCT/US2014/055088 on Sep. 11, 2014, now Pat. No. 9,380,239.

(60) Provisional application No. 62/684,738, filed on Jun. 13, 2018, provisional application No. 61/876,226, filed on Sep. 11, 2013.

(51) Int. Cl.
| *H04N 5/359* | (2011.01) |
| *H04N 5/355* | (2011.01) |
| *H04N 5/3745* | (2011.01) |

(52) U.S. Cl.
CPC ....... *H04N 5/3575* (2013.01); *H04N 5/35509* (2013.01); *H04N 5/35563* (2013.01); *H04N 5/3745* (2013.01)

(58) Field of Classification Search
USPC ....... 348/294–324; 250/208.1; 257/225–234, 257/257, 258, 291–294, 431–448, 431–44
See application file for complete search history.

(56) References Cited

U.S. PATENT DOCUMENTS

| | | | |
|---|---|---|---|
| 5,281,805 A | | 1/1994 | Sauer |
| 5,642,123 A | | 6/1997 | Shinkawa |
| 5,841,126 A | | 11/1998 | Fossum |
| 6,683,645 B1 | | 1/2004 | Collins et al. |
| 7,924,332 B2 | | 4/2011 | Gruev et al. |
| 8,546,765 B2 | | 10/2013 | Ruetten et al. |
| 8,921,754 B2 | | 12/2014 | Frach |
| 9,380,239 B2 | | 6/2016 | Ganguly et al. |
| 9,807,323 B2 | | 10/2017 | Ganguly et al. |
| 2003/0042406 A1 | | 3/2003 | Charbon |
| 2004/0046101 A1* | | 3/2004 | Nakamura ......... H04N 5/35518 250/200 |
| 2004/0051802 A1 | | 3/2004 | Krymski |
| 2005/0134715 A1* | | 6/2005 | Fowler ................. H04N 5/3745 348/308 |
| 2005/0218299 A1 | | 10/2005 | Olsen et al. |
| 2006/0124592 A1 | | 6/2006 | Miller et al. |
| 2007/0046800 A1 | | 3/2007 | Chen et al. |
| 2008/0135895 A1 | | 6/2008 | Lee et al. |
| 2008/0258045 A1* | | 10/2008 | Oike .................... H04N 5/3745 250/208.1 |
| 2009/0219410 A1 | | 9/2009 | Hsu et al. |
| 2009/0256940 A1 | | 10/2009 | Pahr |
| 2009/0302359 A1* | | 12/2009 | Chen .................... H04N 5/3456 257/292 |
| 2010/0044552 A1 | | 2/2010 | Chen |
| 2010/0123812 A1* | | 5/2010 | Sekiguchi ......... H01L 27/14609 348/308 |
| 2011/0108704 A1 | | 5/2011 | Kim et al. |
| 2012/0013780 A1* | | 1/2012 | Mo ........................ H04N 5/378 348/308 |
| 2012/0132787 A1 | | 5/2012 | Mabuchi |
| 2012/0162484 A1 | | 6/2012 | Mo |
| 2012/0176523 A1* | | 7/2012 | Yoo ........................ H04N 5/378 348/301 |
| 2012/0218445 A1 | | 8/2012 | Petilli |
| 2012/0235021 A1* | | 9/2012 | Kasai .................. H04N 5/3559 250/208.1 |
| 2012/0248288 A1* | | 10/2012 | Linder ................. F41G 7/2253 250/208.1 |
| 2012/0261553 A1* | | 10/2012 | Elkind ................. H04N 5/3745 250/208.1 |
| 2012/0280112 A1 | | 11/2012 | Collins |
| 2014/0028883 A1 | | 1/2014 | Shin et al. |
| 2016/0028984 A1 | | 1/2016 | Ganguly et al. |

FOREIGN PATENT DOCUMENTS

| | | |
|---|---|---|
| JP | 6-205307 | 7/1994 |
| JP | 8-70211 | 3/1996 |
| JP | 2005295346 | 10/2005 |
| JP | 2011-525983 | 9/2011 |
| KR | 100847742 | 7/2008 |
| KR | 10-2011-0136828 | 12/2011 |
| WO | 2003021939 | 3/2003 |
| WO | 2006124592 | 11/2006 |

OTHER PUBLICATIONS

EP 14843722.1, Partial Supplementary European Search Report, dated Apr. 5, 2017.
International Application No. PCT/US2006/018437 (WO 2006/124592), International Search Report and Written Opinion, dated Mar. 13, 2007.
International Application No. PCT/US2014/055088, International Search Report and Written Opinion, dated Dec. 5, 2014.
EP14843722.1 Examination Report dated Mar. 26, 2020.

* cited by examiner

IMAGING SYSTEM WITH A DIGITAL CONVERSION CIRCUIT FOR GENERATING A DIGITAL CORRELATED SIGNAL SAMPLE AND RELATED IMAGING METHOD

CROSS-REFERENCE TO RELATED APPLICATIONS

The present application claims the benefit of U.S. Provisional Application No. 62/684,738, filed Jun. 13, 2018 and is a continuation-in-part application of U.S. Non-provisional application Ser. No. 15/872,986, filed Jan. 16, 2018, which is a continuation-in-part application of U.S. Non-provisional application Ser. No. 15/798,393, filed Oct. 30, 2017, which is a continuation-in-part application of U.S. Non-provisional application Ser. No. 15/176,355, filed Jun. 8, 2016 and issued as U.S. Pat. No. 9,807,323, which is a continuation application of U.S. Non-provisional application Ser. No. 14/418,955, filed Feb. 2, 2015 and issued as U.S. Pat. No. 9,380,239, which is a U.S. National Stage filing under 35 U.S.C. § 371 of International Application PCT/US2014/055088, filed Sep. 11, 2014 and entitled "PIXEL CIRCUIT WITH CONSTANT VOLTAGE BIASED PHOTODIODE AND RELATED IMAGING METHOD." The International application claims the benefit of U.S. Provisional Application No. 61/876,226, filed Sep. 11, 2013. The aforementioned U.S. Non-provisional Applications, the International Application, and the U.S. Provisional Applications, including any appendices or attachments thereof, are hereby incorporated by reference in their entirety.

BACKGROUND

Unless otherwise indicated herein, the approaches described in this section are not prior art to the claims in this application and are not admitted to be prior art by inclusion in this section.

Conventional imagers use photodiodes that are light sensitive electronic elements which convert incident light to either current or voltage. The signal from a matrix of such photodiode elements or pixels creates the image. Photodiodes are typically operated in a "charge depletion" mode. In this mode, a capacitor associated with the photodiode in each pixel circuit is pre-charged to 1V-6V reverse bias (or voltage) before light exposure or image acquisition. For instance, the cathode is at a higher voltage level than the anode (the cathode and anode being the two oppositely charged electrodes in a photodiode). A very low leakage current flow is possible between these two terminals. Leakage current is that component of the flow of charge in the photodiode, that does not result from light absorbed by the photodiode. It flows in the "off" state of the device, even when it is not exposed to light and is an undesirable effect. In the charge depletion mode, the photo current generated by image information would passively deplete or remove the charges stored in the reverse bias, so that the voltage across the photodiode gradually drops as it absorbs light projected by the incoming image.

In some prior art passive pixel circuits, the readout action may restore the photodiode reverse bias to the pre-exposure level and measure the amount of charges required to restore this bias. In some prior art active pixel circuits, the voltage left on the photodiode is measured at the end of the exposure. The photodiode reverse bias is then restored by a separate reset action.

The above mentioned prior art approaches have at least the following limitations: (1) the photodiode leakage current may also deplete the stored reverse bias, thus introducing a type of noise known as shot noise and dynamic range limits; (2) the photodiode responsivity may change with its bias voltage, which may be depleted with increased signal acquisition, thus introducing undesirable non-linearity; (3) in many active pixel designs, the accumulated signal charge is represented by the voltage across the photodiode capacitance which itself is a function of the voltage, thereby introducing undesirable non-linearity; and (4) the bias restoration action of the photodiode capacitance may introduce kTC noise (also known as reset noise). Thermal noise on capacitors is referred to as kTC noise (also known as Johnson-Nyquist noise), which includes noise that comes from the reset noise of capacitors.

DETAILED DESCRIPTION

Figure 1A:
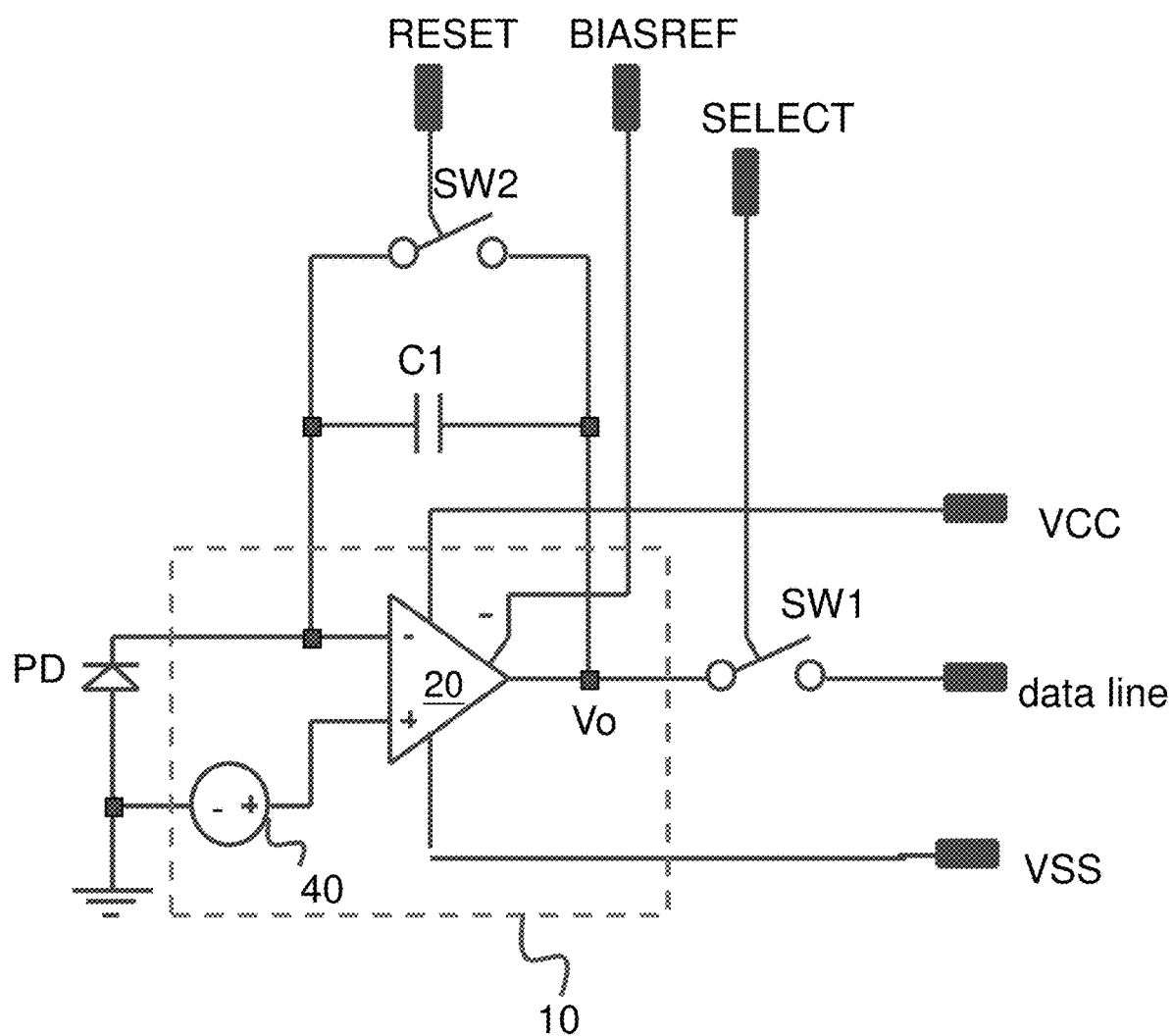
FIG. 1A is a schematic diagram of one example pixel circuit with an operational amplifier in an imaging system.

In the following detailed description, reference is made to the accompanying drawings, which form a part hereof. In the drawings, similar symbols typically identify similar components, unless context dictates otherwise. Numbers provided in flow charts and processes are provided for clarity in illustrating steps and operations and do not necessarily indicate a particular order or sequence. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Unless otherwise defined, the term "or" can refer to a choice of alternatives (e.g., a disjunction operator, or an exclusive or) or a combination of the alternatives (e.g., a conjunction operator, and/or, a logical or, or a Boolean OR).

Throughout this description, the distinction between the bias voltage across the photodiode (i.e., the potential difference preset or maintained across the photodiode cathode and anode terminals) and the bias current operating in the pixels circuit should be noted. Bias voltage is applied to the photodiodes to enable their ability to integrate optical signal through charge depletion. Bias current is applied in active units in pixel circuits to ensure optimal, linear, and low noise operations of the pixel circuits.

FIGS. 1A, 2, 3, and 4 are schematic diagrams of pixel circuits 101, 102, 103, and 104, respectively, in an imaging system, in accordance with at least some embodiments of the present disclosure. Each of the pixel circuits 101, 102, 103, and 104 includes a photodiode PD, a biasing circuit (10 or 15), a charge-to-voltage converter C1, and switches SW1 and SW2. The pixel circuits 101 and 103 may be configured to operate based on control signals RESET, BIASREF, and SELECT, which will be explained in detail in subsequent paragraphs. VCC and VSS represent the power supply voltages supplied to the biasing circuit 10 to ensure proper operations. In some examples, VSS may be coupled to a ground (GND) potential.

The operation of an image sensor is characterized by a sequence of imaging frames, where each frame is typically composed of two periods: (1) an image acquisition period (the times before T1 and after T10, in FIGS. 6A and 6B, are used for image acquisition in the example imager circuits in FIGS. 5A and 5B, respectively) and (2) a frame readout period (the period from T1 to T10, in FIGS. 6A and 6B, represent the frame readout period for the example imager circuits in FIGS. 5A and 5B, respectively). The operations of the pixel circuits 101, 102, 103, and 104, during the frame readout period, may include at least three stages: (a) signal readout period, (b) reset period, and (c) reset level readout period. The biasing circuit 10 or the biasing circuit 15 is configured to provide a constant bias voltage across the photodiode PD during the entire operation, so that the pixel circuits 101, 102, 103, and 104 may operate in a "charge generation" mode. During the image acquisition period, the photodiode PD may be configured to generate charges in response to incoming light or radiation. In the "charge generation" mode, the charges generated by the photodiode PD in response to light or radiation are drained by the biasing circuit 10 or the biasing circuit 15 and are accumulated in the charge-to-voltage converter C1. As previously stated, a prior art pixel circuit is configured to operate in the "charge depletion" mode in which the photodiode responsivity may change with bias voltage, thus introducing undesirable non-linearity. In the present disclosure, since the bias voltage across the photodiode PD is not modulated by incoming light or radiation, the photodiode responsivity is not a function of the amount of signal already captured, and linearity of signal response can thus be maintained.

In the embodiments illustrated in FIGS. 1A, 2, 3, and 4, the charge-to-voltage converter C1 may be, but not limited to, a linear parallel plate capacitor, or another type of device having similar function. During the image acquisition period, the charge-to-voltage converter C1 may be configured to receive the charges drained from the photodiode PD at a first end, accumulate the received charges, and convert the accumulated charges into an output voltage Vo at a second end. During the readout period, the output voltage Vo may be transmitted to a corresponding data line in the imaging system via the switch SW1 for acquiring corresponding video signals, which will be described in detail in subsequent paragraphs. During the reset period, the charge-to-voltage converter C1 may be reset using the switch SW2 for clearing the accumulated charges, thereby ready for the subsequent image acquisition period.

As previously stated, the charges generated due to light or radiation in a prior art active pixel circuit is accumulated in the photodiode capacitance, which is a function of the varying bias voltage, thereby introducing undesirable non-linearity. In the present disclosure, the charges generated due to light or radiation is accumulated in the charge-to-voltage converter C1 instead of in the photodiode capacitance. The "gain" of the charge-to-voltage converter C1 as used herein, is defined as the ratio of output voltage divided by input charge. Since the gain of a linear charge-to-voltage converter, as used in the present disclosure, is, by the definition of linearity, a constant value which is independent of any incoming light radiation or charge accumulated, linear representation of the incoming light or radiation can be provided by direct readout of the output voltage Vo at the second end of the charge-to-voltage converter C1.

It should be noted that when operating in the "charge generation" mode, no bias restoration action needs to be performed on the photodiode PD in a switched manner. Therefore, the pixel circuits 101, 102, 103, and 104 in accordance with at least some embodiments of the present disclosure generate little to no kTC noise, as would be the drawback of conventional pixel circuits.

Figure 3:
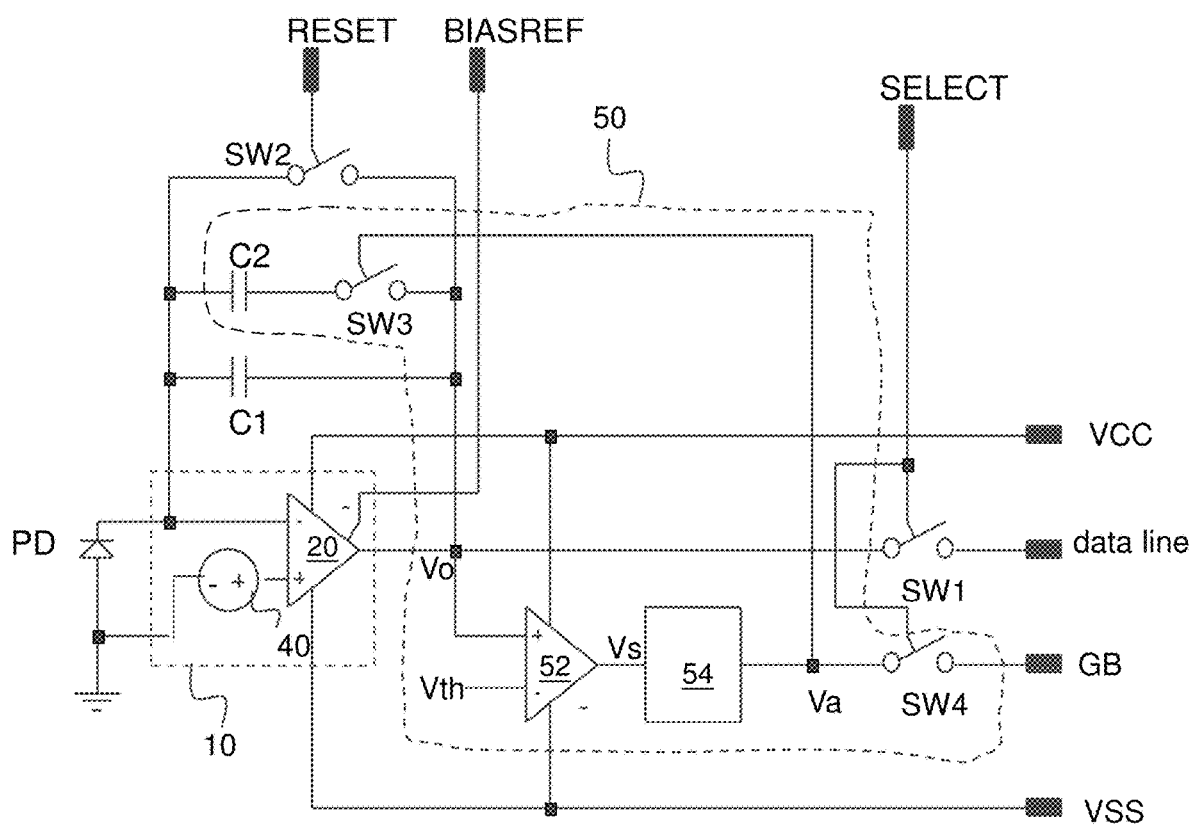
FIG. 3 is a schematic diagram of one example pixel circuit with an operational amplifier, a gain-switching circuit, and a charge-to-voltage converter in an imaging system.

In the embodiments illustrated in FIGS. 1A and 3, the biasing circuit 10 of the pixel circuit 101 or 103 includes an operational amplifier 20 and a voltage source 40. The voltage source 40 is coupled between the non-inverting end of the operational amplifier 20 and the anode of the photodiode PD. The charge-to-voltage converter C1 is coupled between the inverting end and the output end of the operational amplifier 20. The constant bias voltage provided across the photodiode PD is determined by the voltage source 40. The operational amplifier 20 may present a virtual ground node to the photodiode PD, at its inverting input, thus holding that virtual ground node at the same voltage as its non-inverting input. All photo generated charge will be pulled through to the charge-to-voltage converter C1, where it may result in the output voltage Vo that is linearly proportional to the integrated amount of charge that the photodiode PD generated from incoming light signal. However, these photo induced charges do not change the voltage across the photodiode PD, as would be the cause of non-linearity in conventional pixel circuits.

Figure 1B:
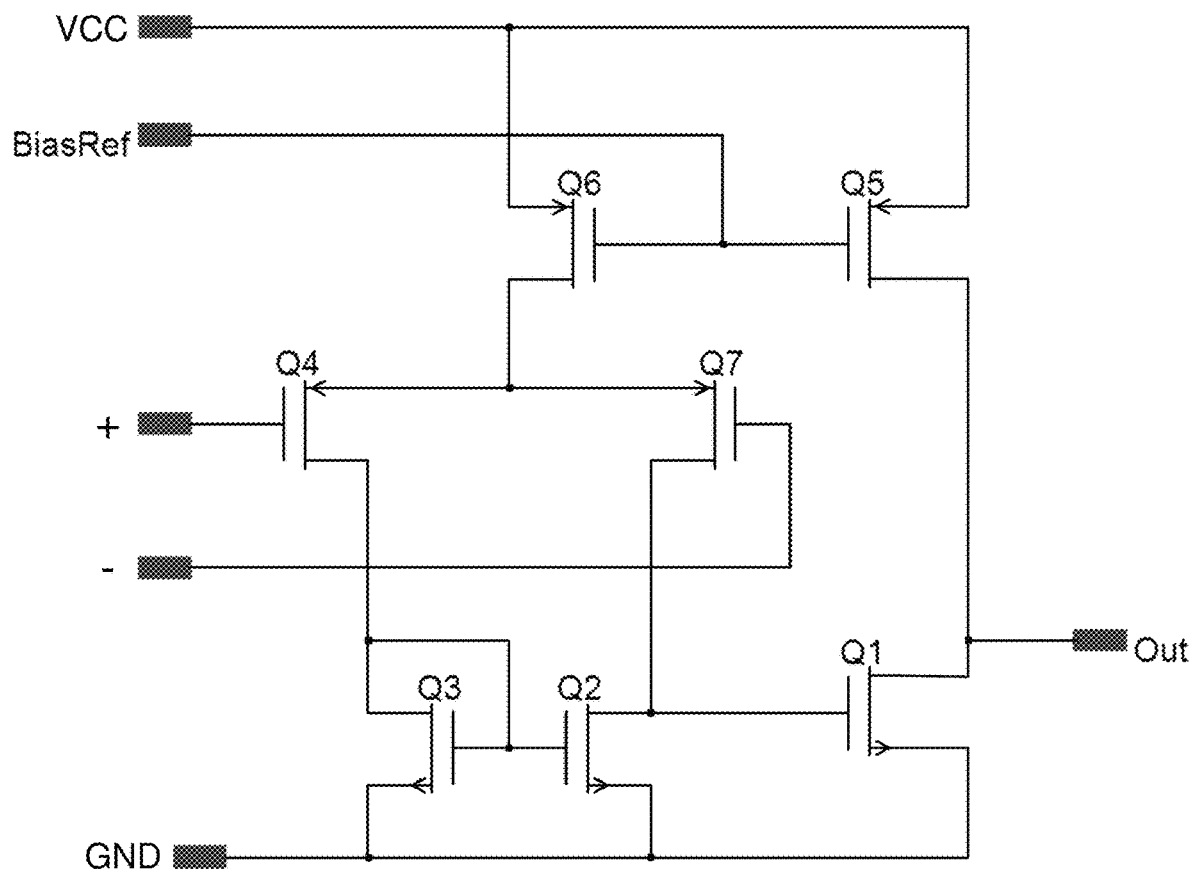
FIG. 1B is a schematic diagram of one example operational amplifier.

In the pixel circuit 101 illustrated in FIG. 1A or the pixel circuit 103 illustrated in FIG. 3, the photodiode PD and the operational amplifier 20 are arranged in a configuration commonly known as an integrator, in order to draw photo generated charges from the photodiode PD, thus keeping the voltage across the photodiode PD constant. The operational amplifier 20 may adopt a circuit topology commonly referred to as a "programmable op-amp" designed with an input signal port that controls a bias current flowing in the internal circuits of the programmable op-amp. One example schematic diagram of the operational amplifier 20 is illustrated in FIG. 1B. Other types of programmable op-amps may also be used.

The bias reference signal BIASREF inputted to the input signal port is used to set the "operational state" of the operational amplifier 20, either a low power operation (with weak driving capability, small bandwidth, low gain and high noise) or a high power operation (with strong driving capability, large bandwidth, high gain and low noise). The "operational state" is a function of the bias current flowing through all the transistors which make up the operational amplifier 20. The bias current is directly derived from a voltage level of the bias reference signal BIASREF. During the image acquisition period when the photodiode PD in the pixel circuit 101 or the pixel circuit 103 is not selected for sending collected signal to the read out electronics, the bias reference signal BIASREF is at a value that results in very low current flowing through the transistors forming the operational amplifier 20. As a result, the operational amplifier 20 operates in a low power state with very weak driving capability and can only manage to pull (or drain) signal charges (generated by the photodiode PD in response to incoming light or radiation) from the photodiode PD in order to keep the photodiode PD at a constant voltage. During the readout period when the photodiode PD in the pixel circuit 101 or the pixel circuit 103 is selected to transmit its collected signal to the read out electronics, the bias reference signal BIASREF is changed to another value, which increases (by as much as 500 times, for example) the bias current flowing through the transistors forming the operational amplifier 20. For a short period of time, the operational amplifier 20 operates in a high power state with strong driving capability of sending signals through long data lines to the readout electronics at very low noise. Based on the bias reference signal BIASREF, the pixel circuit 101 or the pixel circuit 103 may operate either in the low power state during signal collection (around 99.9% of a period) when it is only required to drain the charges generated by the photodiode PD, or in the high power state for very short time (around 0.1% of a period) when it is required to transmit the collected signals, through the long data lines of the pixel array, to the readout electronics for further processing. This modulation of the operational state of the operational amplifier 20 prevents the pixels from being kept in the high power state at all times, which can result in device burn-out and/or high power consumption (which can reduce the battery life of portable imagers).

Figure 2:
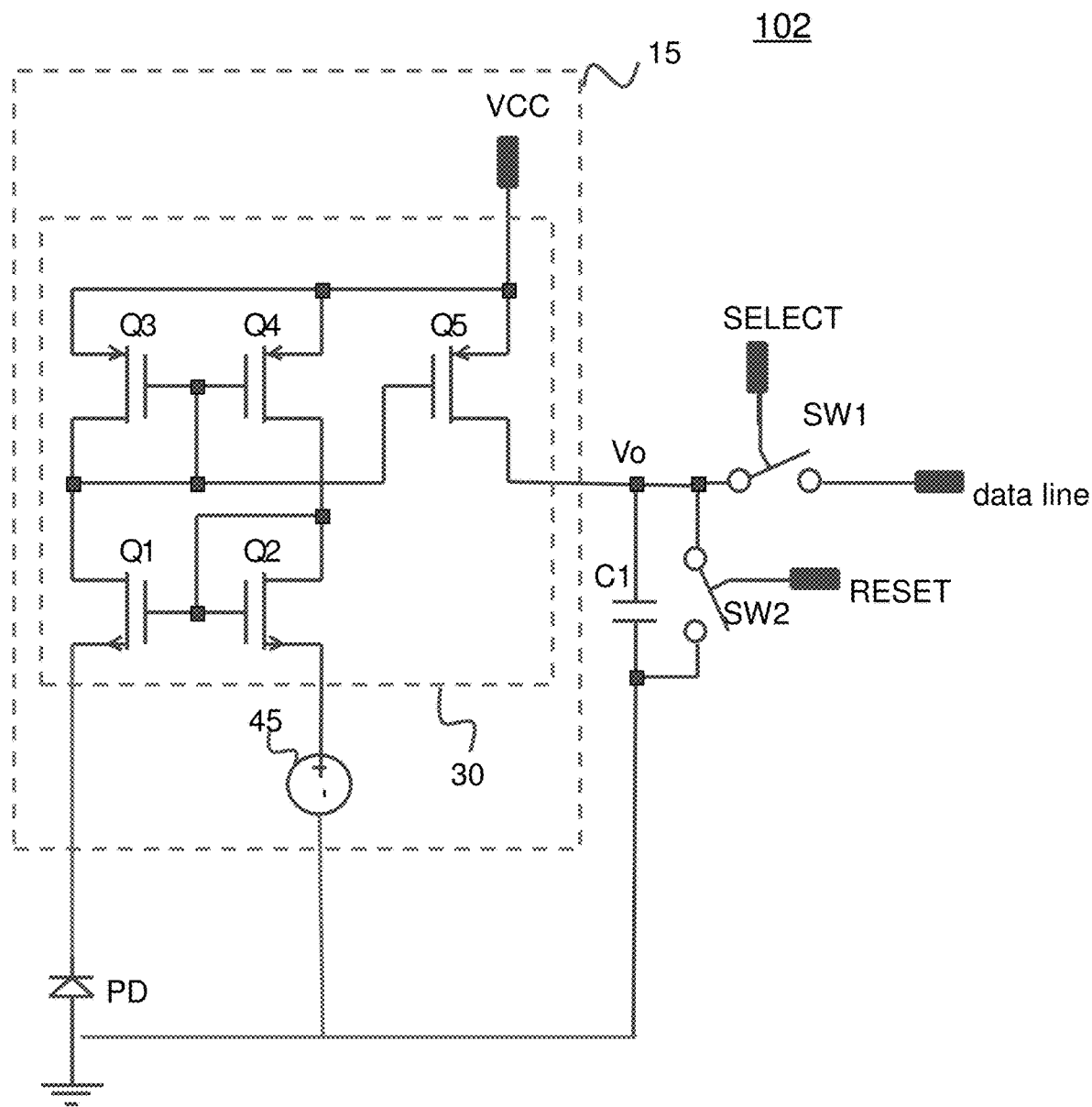
FIG. 2 is a schematic diagram of one example pixel circuit with a current commuter circuit in an imaging system.
Figure 4:
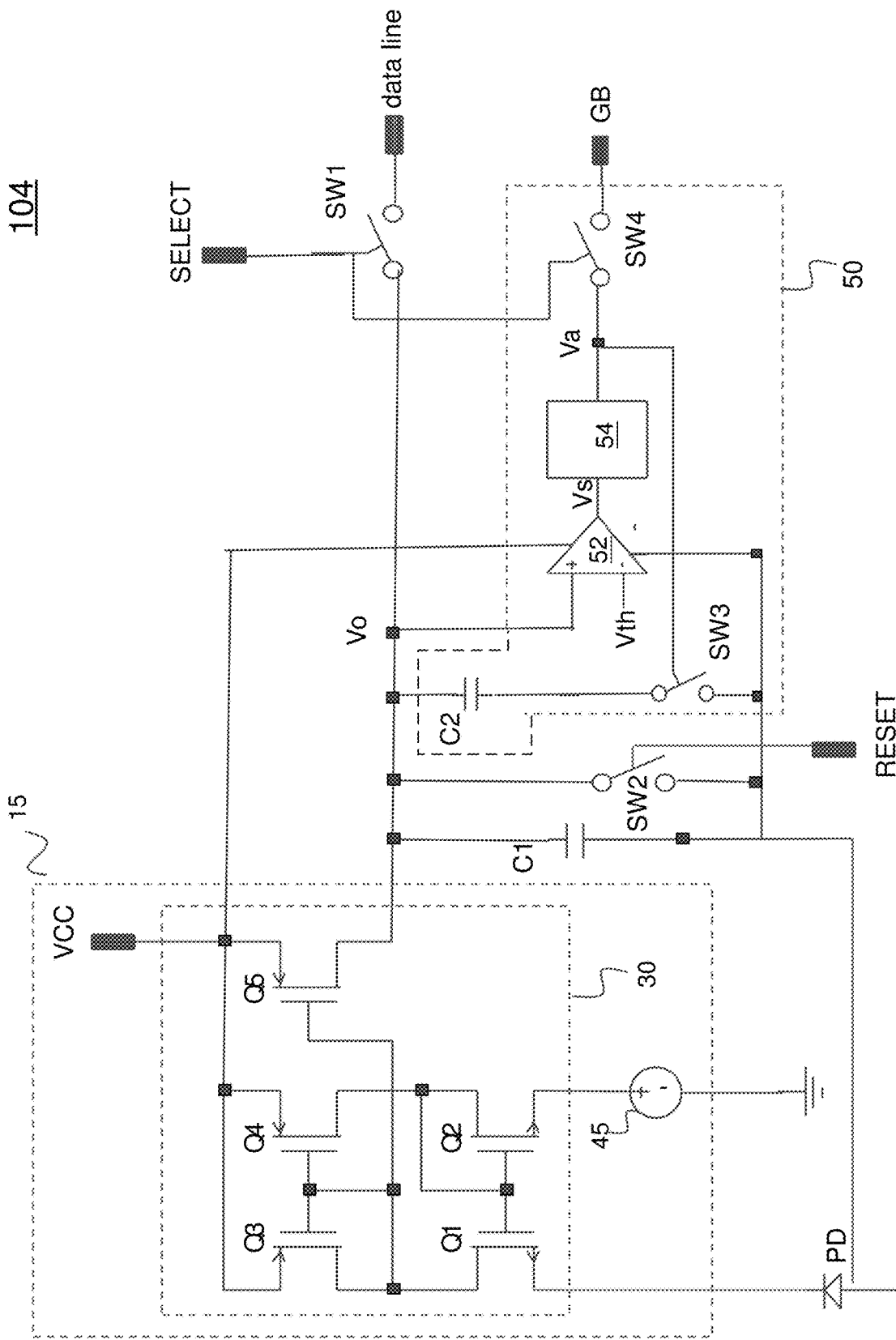
FIG. 4 is a schematic diagram of one example pixel circuit with a current commuter circuit, a gain-switching circuit, and a charge-to-voltage converter in an imaging system.

In the embodiments illustrated in FIGS. 2 and 4, the biasing circuit 15 of the pixel circuit 102 or the pixel circuit 104 includes a current commuter circuit 30 and a voltage source 45. The current commuter circuit 30 includes transistors Q1, Q2, Q3, Q4, and Q5, which may be metal-oxide-semiconductor field-effect transistors (MOSFETs), bipolar junction transistors (BJTs) or other devices having similar functions. The cathode of the photodiode PD is coupled to a first end of the current commuter circuit 30. The voltage source 45 is coupled between a second end of the current commuter circuit 30 and the anode of the photo diode PD. The charge-to-voltage converter C1 is coupled between a third end of the current commuter circuit 30 and the anode of the photodiode PD. The constant bias voltage provided across the photodiode PD is determined by the voltage source 45. The current commuter circuit 30 in the pixel circuits 102 and 104 may generate less electronic noises than the operational amplifier 20 in the pixel circuits 101 and 103.

As previously stated, leakage current limits the length of time that a conventional pixel circuit can be kept in the charge depletion mode (or image acquisition period) since it depletes the initial bias charge stored on the photodiode. Leakage current also results in shot noise which limits the low signal detection capability of a conventional pixel circuit. In accordance with some embodiments of the present disclosure, the voltage source 40 in the biasing circuit 10 or the voltage source 45 in the biasing circuit 15 is configured to provide a bias voltage of 0V so that low to no leakage current is generated in the photodiode PD. As a result, in addition to providing better linearity, the pixel circuits 101, 102, 103, and 104 with zero-biased photodiodes may have long operating time and low shot noise.

In the example embodiments illustrated in FIGS. 1A, 2, 3, and 4, the biasing circuit 10 and the biasing circuit 15 are configured to operate in a first mode (or reduced bias current mode) during the image acquisition period and in a second mode (or increased bias current mode) during the readout period and the reset period. The biasing circuit 10 may switch between the first mode and the second mode based on the bias reference signal BIASREF. In the first mode, the bias current of the biasing circuit 10 is modulated to a lower value which is sufficient to drain the charges from the photodiode PD and maintain the constant bias voltage across the photodiode PD. In the second mode, the bias current of the biasing circuit 10 is modulated to a higher value (as much as 500 times of the lower value) for noise reduction and to provide sufficient drive strength to send the output voltage Vo, at good integrity, to the data line. Therefore, power consumption may be reduced by modulating the bias current of the biasing circuit 10, especially when the pixel circuits 101 and 103 are implemented in an active/passive monolithic imaging system with high pixel counts.

In the example embodiments illustrated in FIGS. 3 and 4, each of the pixel circuits 103 and 104 further includes a gain-switching circuit 50 and a charge-to-voltage converter C2. The gain-switching circuit 50 includes a voltage comparator 52 and a select circuit having a latch 54 and switches SW3 and SW4. The voltage comparator 52 is configured to generate a select logic signal Vs according to the difference between the output voltage Vo and a threshold voltage Vth. The latch 54 is configured to generate a latch signal Va associated with the logic level of the select signal Vs. The charge-to-voltage converter C2, whose gain is lower than that of the charge-to-voltage converter C1, is selectively coupled in parallel with the charge-to-voltage converter C1 via the switch SW3 based on the latch signal Va. The charge-to-voltage converter C2 may be, but not limited to, a linear parallel plate capacitor, or another type of device having similar function.

If the overall charge-to-voltage conversion ratio ("gain") of the pixel circuit 103 or 104 is made as large as possible to achieve the best signal-to noise ratio, the amount of signal charge which can be handled would be lowered. In accordance with at least some embodiments of the present disclosure, the gain of the charge-to-voltage converter C1 may be chosen to be as large as possible to provide the highest possible conversion efficiency, while the gain of the charge-to-voltage converter C2 may be chosen to be significantly lower than that of the charge-to-voltage converter C1 (typically 4 or 16 times lower) to handle a much larger amount of signal charge. At the start of each frame, the switch SW3 in the select circuit is turned off (open-circuited), and the overall charge-to-voltage conversion ratio of the pixel circuit 103 or 104 is thus determined by the gain of the charge-to-voltage converter C1 alone. Under such circumstance, the pixel circuit 103 or 104 may improve the charge-to-voltage conversion efficiency and the signal-to-noise ratio.

As previously stated, the output voltage Vo provided by the charge-to-voltage converter C1 is proportional to the charges generated by and drained from the photodiode PD, and the logic select signal Vs provided by the voltage comparator 52 is determined by the difference between the output voltage Vo and the threshold voltage Vth. If the photodiode PD is exposed to low level of light or radiation, the charges accumulated in the charge-to-voltage converter C1 may result in the output voltage Vo which does not exceed the threshold voltage Vth. At this moment, the select signal Vs generated by the voltage comparator 52 is at a logic low level and the corresponding latch signal Va generated by the latch 54 in the select circuit keeps the switch SW3 in the "off" state. Therefore, the overall charge-to-voltage conversion ratio of the pixel circuit 103 or 104 is still determined by the higher gain of the charge-to-voltage converter C1 alone, thereby improving the charge-to-voltage conversion efficiency and the signal-to-noise ratio.

If the photodiode PD is exposed to high level of light or radiation, the charges accumulated in the charge-to-voltage converter C1 may be sufficiently large so that the output voltage Vo increases rapidly until it exceeds the threshold voltage Vth. Under this condition, the select signal Vs generated by the voltage comparator 52 is at a logic high level, and the corresponding latch signal Va generated by the latch 54 in the select circuit turns the switch SW3 on (short-circuited), thereby allowing the charge-to-voltage converter C2 to be coupled in parallel with the charge-to-voltage converter C1. Therefore, the overall charge-to-voltage conversion ratio of the pixel circuit 103 or 104 may now be determined by parallel combination of the charge-to-voltage converter C1 and the charge-to-voltage converter C2. The overall charge-to-voltage conversion ratio can be mathematically derived from the earlier definition of charge converter gain, so the gain of a parallel combination is lower than the gain of either individual converter, thereby allowing the pixel circuit 103 or 104 to integrate much larger amounts of signal charge.

In this way, dark (low level of light or radiation) regions in an image may be captured with high gain and low additive noise, while bright (high level of light or radiation) regions are captured with high signal capacity. Pixel data captured at low gain, may be flagged by the latch output as a gain bit value GB, which is multiplexed out in parallel with the output voltage Vo (by controlling the switches SW1 and SW4). A subsequent image processing computer (not shown) may then digitally multiply the representative digital value for that pixel, with a calibrated gain ratio for that pixel, to restore linear signal values for all pixels, but with much larger dynamic range than is possible with fixed gain designs in prior art pixel circuits.

Figure 5A:
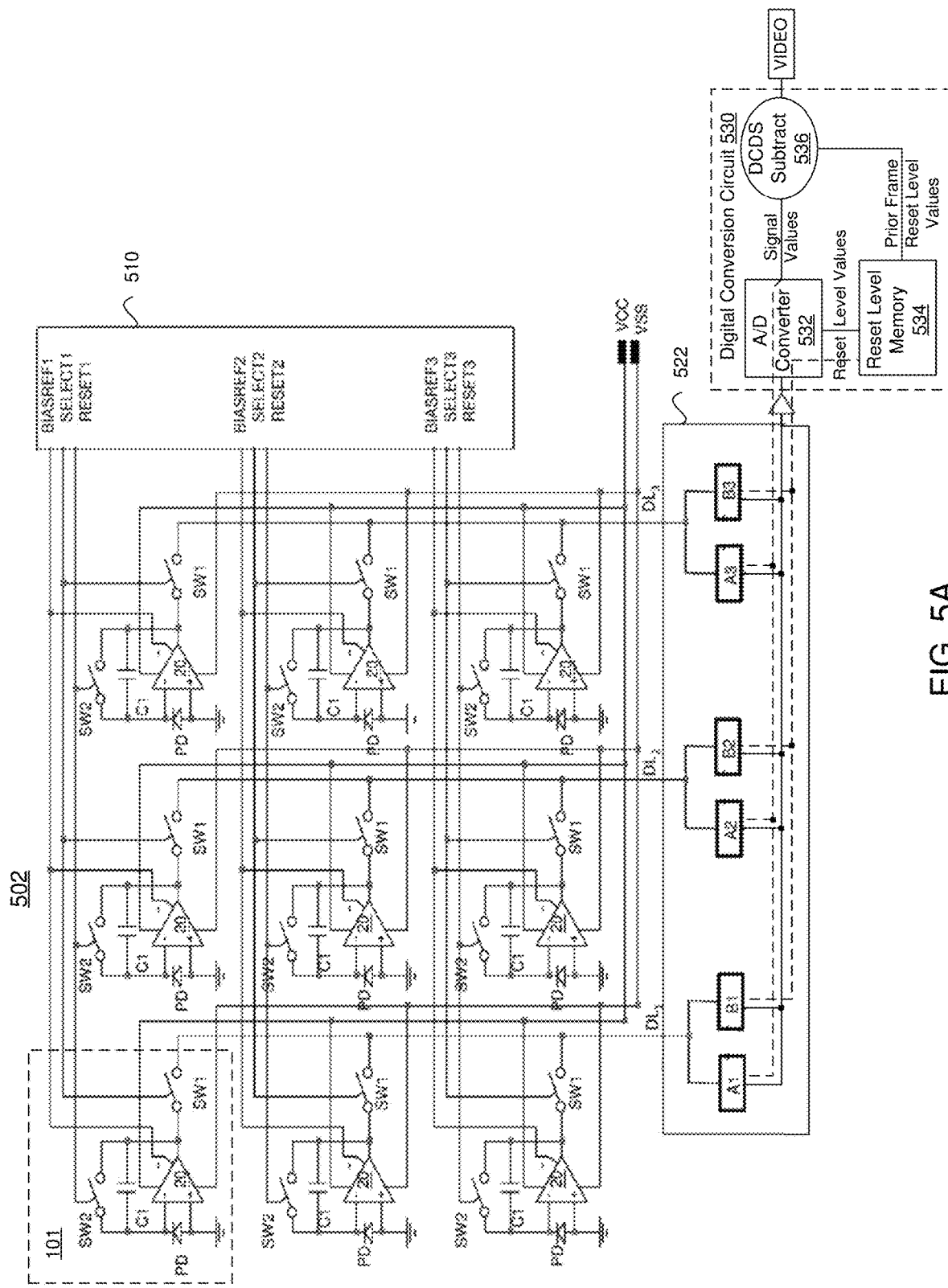
FIG. 5A is a schematic diagram of an imaging system that is implemented with the pixel circuit illustrated in FIG. 1A.
Figure 6A:
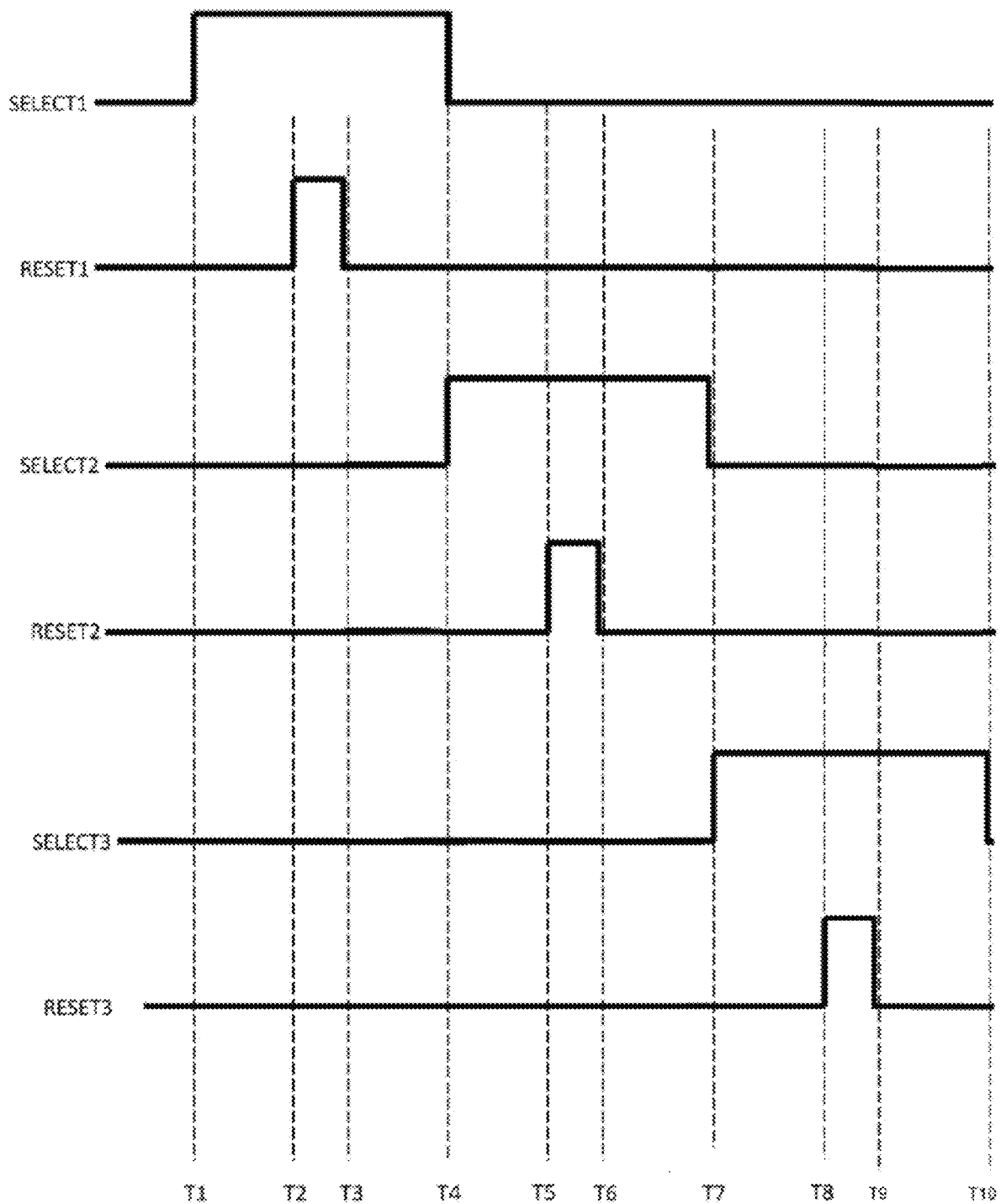
FIG. 6A is a timing diagram of the readout portion of an imaging frame illustrating the operations of the imaging system of FIG. 5A.
Figure 6B:
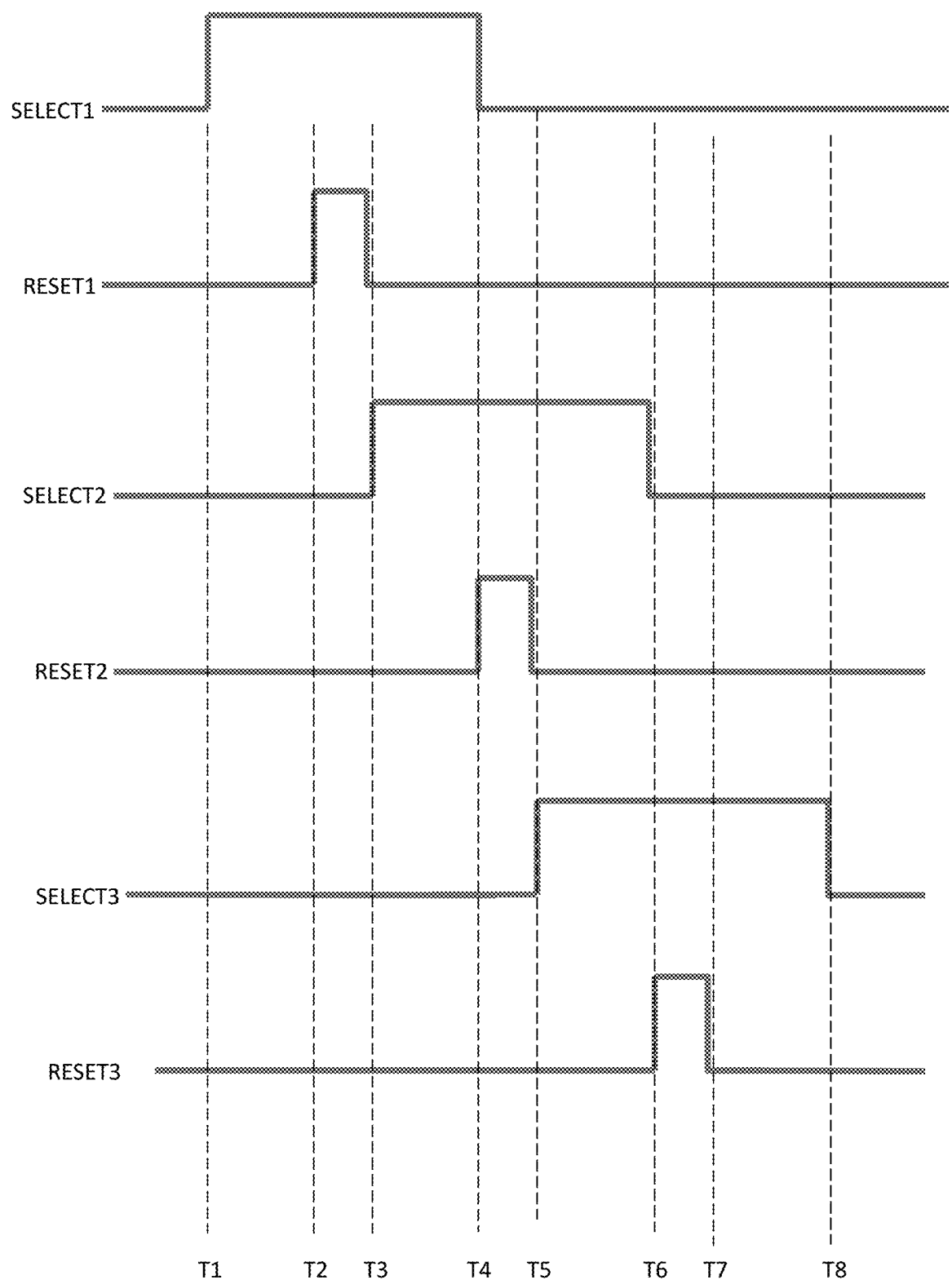
FIG. 6B is a timing diagram of the readout portion of an imaging frame illustrating the operations of the alternate imaging system of FIG. 5B.

FIG. 5A is a schematic diagram of an imaging system 502 which is implemented by using the pixel circuit 101 of FIG. 1A, in accordance with at least some embodiments of the present disclosure. The imaging system 502 may be arranged as an M×N pixel imager array, wherein M and N are positive integers. FIG. 5A depicts an embodiment when M=N=3 for illustrative purpose. Although the pixel circuit 101 is used for illustration, each of the pixel circuits 102, 103, and 104 may also be implemented in an imaging system in the same manner. The timing of the operation of the imaging system in FIG. 5A, during the frame readout period, is shown in FIG. 6A. In some embodiments, upon completion of image acquisition, the signal stored on each pixel circuit may be read out through the matrix data lines and the column readout circuit 522 to form a raster video signal VIDEO. Sequentially, typically on a matrix row-by-row basis, the in-pixel operational amplifiers 20 of that row may operate with an elevated bias current based on the corresponding bias signal, and the switches SW1 of that row may be turned on by the corresponding select signal. Thus, the output ends of the operational amplifiers 20 in that row may be connected, through the matrix data lines, to the column readout circuit 522. After capturing the signal sample from each data line, the reset signal for that row may be activated to clear the accumulated signal charge and prepare the pixel circuits for the next image acquisition period. Upon completion of this reset, the reset level sample of each selected pixel may be captured by the same or similar means as the signal sample. The reset level sample represents the exact state of the pixel circuit after reset and therefore can be used to represent the starting level to which signals acquired during the subsequent image acquisition period, will be added.

FIG. 6A is a timing diagram illustrating the operations of the imaging system 502 of FIG. 5A, in accordance with at least some embodiments of the present disclosure. When the select signals SELECT1, SELECT2, and SELECT3 are active (represented by the high level in FIG. 6A), the switches SW1 are turned on to allow the column readout circuit 522 to acquire the signal samples and the reset level samples from corresponding pixel circuits. In some embodiments, the select signal for each row may be kept active for a sufficient time before and after the corresponding reset signal becomes inactive, to allow the processing circuits A1, A2, and A3 to acquire the signal samples from corresponding pixel circuits before resetting the charge-to-voltage converters C1 and to allow the processing circuits B1, B2, and B3 to acquire the reset level samples from corresponding pixel circuits after resetting the charge-to-voltage converters C1. A reset level sample acquired from a pixel circuit may be representative of the level to which the operational amplifiers 20 was reset, in preparation for the next image acquisition period. This reset level sample may then be stored for subtraction from the signal sample that is read out from that pixel during the next frame readout period, thus performing correlated double sampling, to eliminate the reset noise of the operational amplifiers 20.

The imaging system 502 also includes a row control circuit 510 and a column readout circuit 522. The row control circuit 510 is configured to generate control signals for operating corresponding pixel circuits 101, including bias reference signals BIASREF1, BIASREF2, and BIASREF3, select signals SELECT1, SELECT2, and SELECT3, and reset signals RESET1, RESET2, and RESET3. The bias reference signals BIASREF1, BIASREF2, and BIASREF3 are used to modulate the bias current of the operational amplifiers 20 in the first, second, and third rows of the pixel circuit 101, respectively. The select signals SELECT1, SELECT2, and SELECT3 are used to turn on the switches SW1 in the first, second, and third rows of the pixel circuit 101, respectively, so that the output signal Vo of a corresponding row may be transmitted to the column readout circuit 522. Timing of the modulation of the bias reference signals BIASREF1, BIASREF2, and BIASREF3 is typically performed to be synchronous with the corresponding select signals SELECT1, SELECT2, and SELECT3. The reset signals RESET1, RESET2, and RESET3 are used to turn on the switches SW2 in the first, second, and third rows of the pixel circuit 101, respectively, so as to clear the charges accumulated in the charge-to-voltage converters C1 of a corresponding row for the next image acquisition. In the timing embodiment shown in FIG. 6A, the reset period is defined as during intervals T2 to T3 for RESET1, T5 to T6 for RESET2 and T8 to T9 for RESET3.

The column readout circuit 522 in FIG. 5A includes a first set of processing circuits (e.g. A1, A2 and A3 in this embodiment), a second set of processing circuits (e.g. B1, B2 and B3 in this embodiment), a plurality of data lines $DL_1$, $DL_2$, and $DL_3$, where each data line is coupled to two processing circuits (e.g., data line $DL_1$ is coupled to processing circuits A1 and B1). The first processing circuit includes processing units A1, A2, and A3 each configured to process the output voltages Vo received from a corresponding column of the pixel circuit 101 via a corresponding signal data line. In the timing embodiment shown in FIG. 6A, processing units A1, A2, and A3 sequentially (during intervals {T1 to T2}, {T4 to T5} and {T7 to T8}, as shown in FIG. 6A) acquire and store the signal values via their respective data lines during the signal readout period. These signal values are then (during intervals {T2 to T4}, {T5 to T7} and {T8 to T10}, as shown in FIG. 6A) sequentially converted to digital values by the analog-to-digital converter (A/D converter) 532 and have subtracted from the signal values, by the digital correlated double sampling (DCDS) subtraction circuit 536, their matching stored reset level values that were acquired during the previous frame readout period, for each pixel and stored, in the reset level memory 534. A digital conversion circuit 530 can include the A/D converter 532, the reset level memory 534, and the DCDS subtraction circuit 536. The second processing circuit includes processing unit B1, B2, and B3 each configured to process the reset level output voltages Vo received from a corresponding column of the pixel circuit 101 via a corresponding reset data line (during intervals {T3 to T4}, {T6 to T7} and {T9 to T10}, as shown in FIG. 6A) during the reset level readout period. These signal values will then (during intervals {T4 to T6}, {T7 to T9} and {T10 to T12 (not shown)}, as shown in FIG. 6A) be sequentially converted to digital values, by the A/D converter 532 and stored in the memory 534, for subtraction from the signal values that will be acquired during the next frame.

Figure 5B:
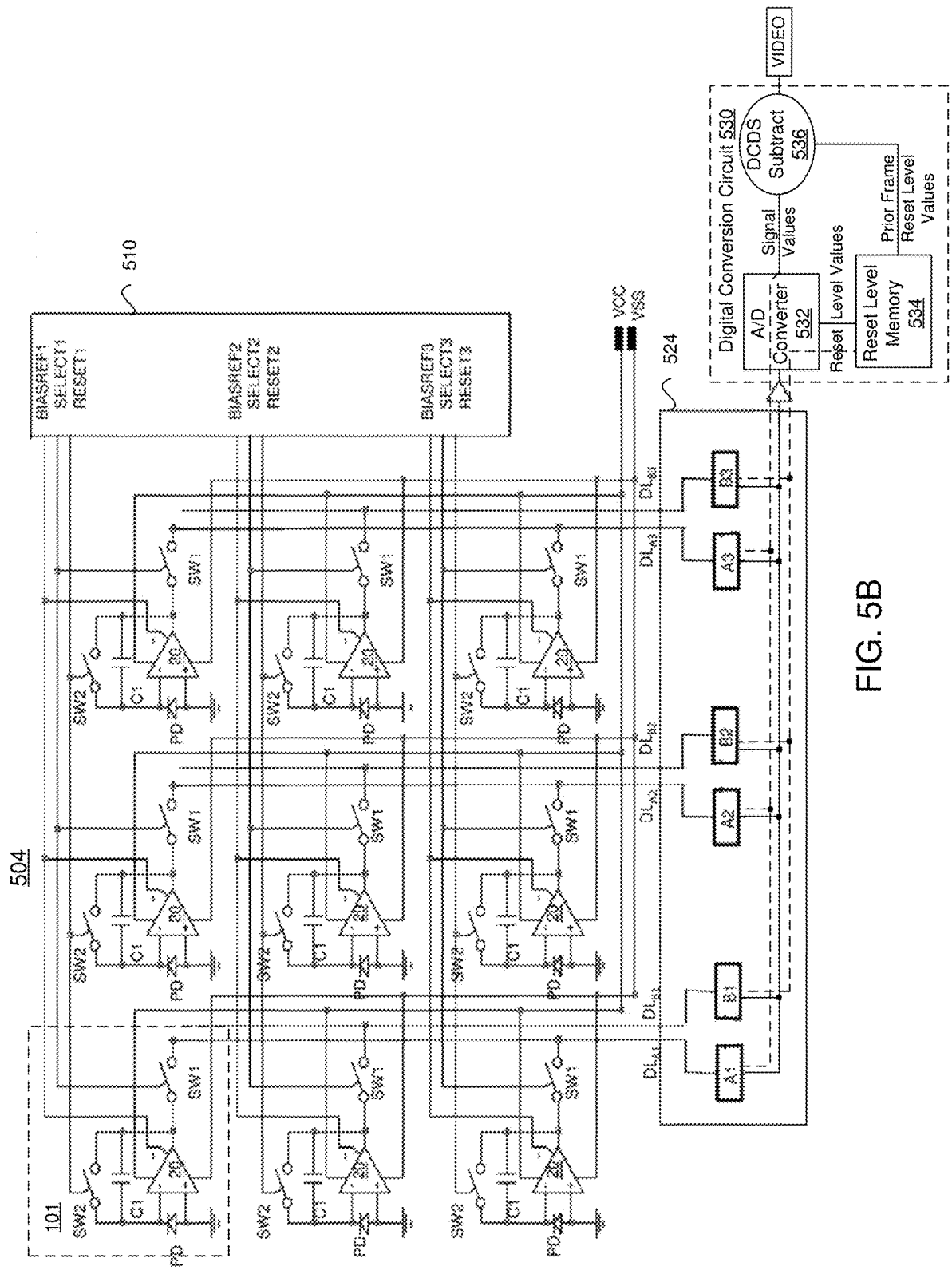
FIG. 5B is an alternate schematic diagram of the imaging system that is implemented with the pixel circuit illustrated in FIG. 1A.

FIG. 5B is a schematic diagram of an alternate embodiment of imaging system 504 which is implemented with the pixel circuit 101 of FIG. 1A, which is similar to FIG. 5A, but optimized to achieve faster frame rate whereby two processing circuits and two data lines are provided for a corresponding column of the pixel circuit 101. The column readout circuit 524 in FIG. 5B is similar in function to column readout circuit 522 in FIG. 5A, but the two data lines are provided for a corresponding column of the pixel circuit 101 and each data line is coupled to its own processing circuit (e.g., data line $DL_{A1}$ is coupled to processing circuit A1 and data line $DL_{B1}$ is coupled to processing circuit B1). The timing sequence of events for this alternate embodiment is shown in FIG. 6B. For example, during time period {T3 to T4}, when the switches SW1 in the first row of the pixel circuit 101 are turned on by the select signal SELECT1, the processing unit B1 may acquire a reset level sample by latching the output voltage Vo, for the first row via the signal data line $DL_{B1}$. At the same time, the processing unit A1 may acquire a signal sample from the second row by latching the output voltage Vo via the data line $DL_{A1}$ through the action of the SELECT2 signal on the switches SW1 of that row. Similarly, the reset level sample of the second row and the signal sample of the third row may be acquired during {T5 to T6} when both the select signals SELECT2 and SELECT3 are active. Thus, this alternate embodiment may achieve a higher rate of reading out the data from all the pixels in the array. This is one example of where parallelism can be employed to decrease the time required to read signal and reset level values from the entire pixel array.

In the timing embodiment shown in FIG. 6B, the reset period is defined as during intervals T2 to T3 for RESET1, T4 to T5 for RESET2 and T6 to T7 for RESET3. The processing units A1, A2, and A3 sequentially (during intervals {T1 to T2}, {T3 to T4} and {T5 to T6}, as shown in FIG. 6B) acquire and store the signal values via their respective data lines during the signal readout period. These signal values are then (during intervals {T2 to T4}, {T4 to T6} and {T6 to T8}, as shown in FIG. 6B) sequentially converted to digital values by the A/D converter 532 and have subtracted from the signal values, by DCDS subtraction circuit 536, their matching stored reset level values that were acquired during the previous frame readout period, for each pixel and stored, in the reset level memory 534. The processing units B1, B2, and B3 are each configured to process the reset level output voltages Vo received from a corresponding column of the pixel circuit 101 via a corresponding reset data line (during intervals {T3 to T4}, {T5 to T6} and {T7 to T8}, as shown in FIG. 6B) during the reset level readout period. These signal values will then (during intervals {T4 to T6}, {T6 to T8} and {T8 to T10 (not shown)}, as shown in FIG. 6B) be sequentially converted to digital values, by the A/D converter 532 and stored in the memory 534, for subtraction from the signal values that will be acquired during the next frame.

Figure 5C:
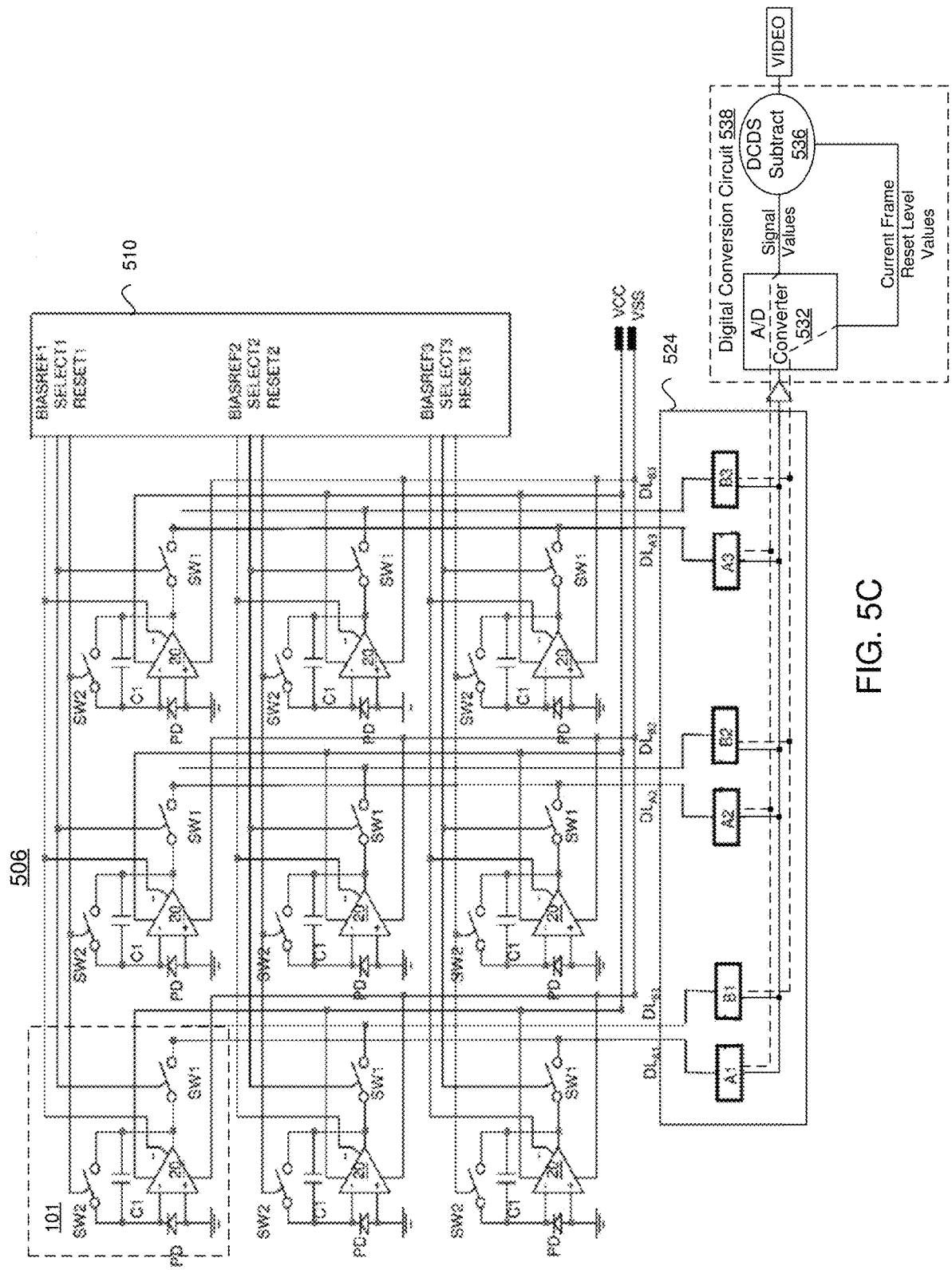
FIG. 5C is an alternate schematic diagram of the imaging system that is implemented with the pixel circuit illustrated in FIG. 1A.

FIG. 5C is a schematic diagram of an alternate embodiment of imaging system 506 which is implemented with the pixel circuit 101 of FIG. 1A, which is similar to FIG. 5B, but includes a digital conversion circuit 538 with an A/D converter 532 and subtraction circuit 536 (without memory 534). In the timing embodiment shown in FIG. 6B, processing units A1, A2, and A3 sequentially (during intervals {T1 to T2}, {T3 to T4} and {T5 to T6}, as shown in FIG. 6B) acquire and store the signal values via their respective data lines during the signal readout period. The signal values from processing units A1, A2, and A3 (during intervals {T2 to T4}, {T4 to T6} and {T6 to T8}, as shown in FIG. 6B) are sequentially converted to digital values by the analog-to-digital converter (A/D converter) 532. The processing units B1, B2, and B3 sequentially ((during intervals {T3 to T4}, {T5 to T6} and {T7 to T8}, as shown in FIG. 6B) store the reset level output values via their respective data lines during the reset level readout period. The reset level output values from processing unit B1, B2, and B3 (during intervals {T4 to T6}, {T6 to T8} and {T8 to T10 (not shown)}, as shown in FIG. 6B) are sequentially converted to digital values, by the A/D converter 532 and subtracted from the signal values acquired during the same frame, by the digital correlated double sampling (DCDS) subtraction circuit 536. Although the reset level output values read out in the same frame as the signal values do not represent the starting voltage of the pixel (and may not provide as accurate of a digital correlated signal value), the reset level output values can act as a proxy (or substitute typical reset level output value for the pixel) for the reset level output value prior to the image acquisition period, which does not require a separate reset level memory for the reset level output value of the prior frame readout.

The imaging systems illustrated in FIGS. 5A-5C can also include a central control timing circuit (not shown), such as an programmable field-programmable gate array (FPGA), that can coordinate the generation of the timing signals in FIGS. 6A and 6B, as well as control the processing circuits A1, A2, A3, B1, B2, and B3 and digital conversion circuit 530 or 538, including the A/D converter 532, memory 534, and the DCDS subtraction circuit 536. The dashed lines shown in FIGS. 5A-5C between processing circuits A1, A2, A3, B1, B2, and B3 and the digital conversion circuits 530 and 538 can represent synchronization or control between processing circuits A1, A2, A3, B1, B2, and B3 and the functions of the digital conversion circuits 530 and 538.

Figure 7:
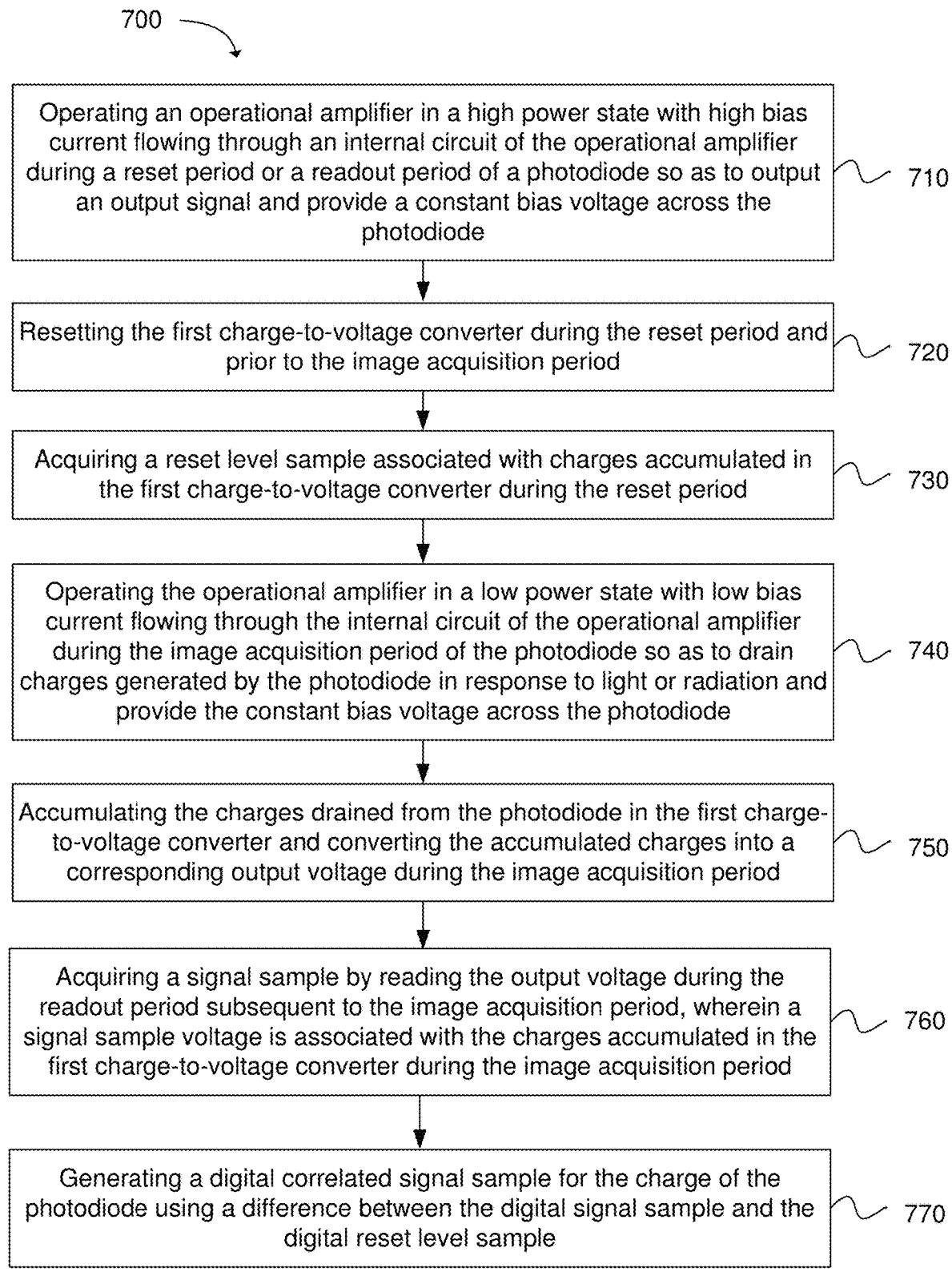
FIG. 7 is a flowchart illustrating an example of a method of generating a digital correlated signal sample for the charges of a photodiode in an imaging pixel array, all arranged in accordance with at least some embodiments of the present disclosure.

The flowchart shown in FIG. 7 illustrates a method 700 of generating a digital correlated signal sample for the charges of a photodiode in an imaging pixel array. The method includes the step of operating an operational amplifier in a high power state with high bias current flowing through an internal circuit of the operational amplifier during a reset period or a readout period of a photodiode so as to output an output signal and provide a constant bias voltage across the photodiode, as in step 710. The step of resetting the first charge-to-voltage converter during the reset period and prior to the image acquisition period follows, as in step 720. The next step of the method includes acquiring a reset level sample associated with charges accumulated in the first charge-to-voltage converter during the reset period, as in step 730. The method can further include converting the reset level sample, using an A/D converter, to a digital reset level sample and storing the digital reset level sample in memory. The method further includes operating the operational amplifier in a low power state with low bias current flowing through the internal circuit of the operational amplifier during the image acquisition period of the photodiode so as to drain charges generated by the photodiode in response to light or radiation and provide the constant bias voltage across the photodiode, as in step 740. The next step of the method can include returning the operational amplifier to the high power state with high bias current flowing through an internal circuit of the operational amplifier during a reset period or a readout period of a photodiode so as to output an output signal and provide a constant bias voltage across the photodiode. The next step of the method can include accumulating the charges drained from the photodiode in the first charge-to-voltage converter and converting the accumulated charges into a corresponding output voltage during the image acquisition period, as in step 750. The method further includes acquiring a signal sample by reading the output voltage during the readout period subsequent to the image acquisition period, as in step 760. A signal sample voltage is associated with the charges accumulated in the first charge-to-voltage converter during the image acquisition period. The method can further include converting the signal sample, using the A/D converter, to a digital signal sample. The next step of the method includes generating a digital correlated signal sample for the charge of the photodiode using a difference between the digital signal sample and the digital reset level sample, as in step 770.

Some embodiments of an imaging system include: means for operating (e.g., the row control circuit 510) an operational amplifier (e.g., the operational amplifier 20 in the pixel circuit 101 or the pixel circuit 103) in a low power state with low bias current flowing through an internal circuit of the operational amplifier during an image acquisition period of a photodiode (e.g., the PD in the pixel circuit 101 or the pixel circuit 103) so as to drain charges generated by the photodiode in response to light or radiation and provide a constant bias voltage across the photodiode; means for operating (e.g., the row control circuit 510) the operational amplifier (e.g., the operational amplifier 20 in the pixel circuit 101 or the pixel circuit 103) in a high power state with high bias current flowing through the internal circuit of the operational amplifier during a reset period and/or a readout period so as to generate an output signal and provide the constant bias voltage across the photodiode; means for accumulating the charges drained from the photodiode (e.g., C1 in the pixel circuit 101 or the pixel circuit 103) and converting the accumulated charges into the corresponding output voltage during the image acquisition period; and means for acquiring a signal sample (e.g., the column readout circuit 522 or 524 and/or SW2 in the pixel circuit 101 or the pixel circuit 103) by reading the output voltage during the readout period subsequent to the image acquisition period, wherein the signal sample voltage is associated with the charges accumulated by the means for accumulating the charges during the image acquisition period.

The imaging system may also include means for resetting (e.g., the row control circuit 510 and/or SW2 in the pixel circuit 101 or the pixel circuit 103) the means for accumulating the charges during the reset period and prior to the image acquisition period; means for acquiring a reset level sample (e.g., the column readout circuit 522 or 524 and/or SW2 in the pixel circuit 101 or the pixel circuit 103) associated with charges accumulated in the means for accumulating the charges during the reset period; and means for generating a digital correlated signal sample (e.g., the digital conversion circuit 530) for the charge of the photodiode using a difference between a digital value of the signal sample and a digital value of the reset level sample.

The means for generating a digital correlated signal sample may also include means for converting (e.g., A/D converter 532) the signal sample to the digital signal sample and the reset level sample to the digital reset level sample for each pixel circuit. In another example, the means for generating a digital correlated signal sample may also include means for converting (e.g., A/D converter 532) the signal samples and the reset level samples to digital values. The means for generating a digital correlated signal sample may also include means for storing the digital value (e.g., memory 534) of the reset level sample before acquiring the signal sample and generating the digital value of the signal sample. The imaging system may also include means for generating a video signal (e.g., DCDS subtraction circuit 536) for a pixel array from the digital correlated signal sample of the photodiodes (associated with the charge generated by the photodiode). In another example, the means for generating a digital correlated signal sample may also include means for storing (e.g., memory 534) the reset level samples acquired during one frame readout period until subtraction from the signal samples acquired during the next readout period, and means for subtracting (e.g., subtraction circuit 536) the digital values of the reset level samples from the signal samples.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. An imaging system having a pixel array comprising:
a plurality of pixel circuits, each pixel circuit includes:
  a photodiode configured to generate charges in response to light or radiation;
  a biasing circuit comprising an operational amplifier, which includes an input signal port for receiving a bias reference signal that controls a bias current flowing through an internal circuit of the operational amplifier;
  a first charge-to-voltage converter configured to accumulate the charges drained by the biasing circuit and convert the accumulated charges into the corresponding output voltage; and
  a first switch configured to selectively couple the first charge-to-voltage converter to at least one data line, wherein the at least one data line is coupled to at least two pixel circuits in a column; and a digital conversion circuit configured to generate a digital correlated signal sample for each pixel circuit using a difference between a digital signal sample and a digital reset level sample;

wherein for each pixel circuit:
the operational amplifier is configured to operate in a high power state with the bias current of a first value flowing through the internal circuit of the operational amplifier when the bias reference signal is set to a first level during a readout period of the photodiode so as to drain charges generated by the photodiode and provide a constant bias voltage across the photodiode; and
the operational amplifier is configured to operate in a low power state with the bias current of a second value flowing through the internal circuit of the operational amplifier when the bias reference signal is set to a second level during an image acquisition period of the photodiode so as to output an output signal and provide the constant bias voltage across the photodiode; and
the second value is smaller than the first value.

2. The imaging system of claim 1, further comprising:
a column readout circuit coupled to a plurality of data lines, and the column readout circuit includes:
a signal sample processing circuit configured to read a signal sample for each at least one data line; and
a reset level sample processing circuit configured to read a reset level sample for each at least one data line.

3. The imaging system of claim 1, wherein the digital conversion circuit further comprises:
a memory configured to store the digital reset level sample for each pixel circuit.

4. The imaging system of claim 3, wherein the digital conversion circuit further comprises:
an analog-to-digital converter (A/D converter) configured to convert the signal sample to the digital signal sample and the reset level sample to the digital reset level sample for each pixel circuit, wherein the A/D converter is coupled to the column readout circuit and the memory; and
subtraction circuit configured to generate the digital correlated signal sample for each pixel circuit using the difference of the digital reset level sample from the digital signal sample, wherein the subtraction circuit is coupled to the A/D converter and the memory.

5. The imaging system of claim 1, wherein the digital conversion circuit further comprises:
an analog-to-digital converter (A/D converter) coupled to a column readout circuit and configured to convert the reset level sample at a beginning of an image acquisition period to the digital reset level sample and convert the signal sample acquired at an end of the image acquisition period to the digital signal sample for each pixel circuit; and
subtraction circuit coupled to the A/D converter and configured to generate the digital correlated signal sample for each pixel circuit using the difference of the digital reset level sample from the digital signal sample.

6. The imaging system of claim 1, wherein the each pixel circuit further comprises:
a gain-switching circuit configured to detect the output voltage and provide a second charge-to-voltage converter to accumulate the charges generated by the photodiode in response to the output voltage exceeding a threshold voltage.

7. The imaging system of claim 6, wherein:
the gain-switching circuit comprises:
a voltage comparator configured to generate a select signal according to a difference between the output voltage and the threshold voltage; and
a select circuit configured to generate a latch signal associated with a logic level of the select signal; and
the second charge-to-voltage converter is selectively coupled in parallel with the first charge-to-voltage converter based on the latch signal.

8. The imaging system of claim 1, wherein:
the first charge-to-voltage converter comprises:
a first end coupled to a cathode of the photodiode; and
a second end for outputting the output voltage; and
the operational amplifier comprises:
a non-inverting input end;
an inverting input end coupled to the cathode of the photodiode;
an output end coupled to the second end of the first charge-to-voltage converter; and
an input signal port for receiving the bias reference signal.

9. The imaging system of claim 1, wherein each pixel circuit further comprises:
a second switch to reset the first charge-to-voltage converter.

10. The imaging system of claim 1, further comprising:
a first processing circuit configured to:
acquire a first signal sample by reading an output voltage generated by the first charge-to-voltage converter in a first pixel circuit among the plurality of the pixels circuits before resetting the first charge-to-voltage converter in the first pixel circuit; and
acquire a second signal sample by reading an output voltage generated by the first charge-to-voltage converter in a second pixel circuit among the plurality of the pixels circuits before resetting the first charge-to-voltage converter in the second pixel circuit; and
a second processing circuit configured to:
acquire a first reset level sample by reading the output voltage generated by the first charge-to-voltage converter in the first pixel circuit after resetting the first charge-to-voltage converter in the first pixel circuit; and
acquire a second reset level sample by reading the output voltage generated by the first charge-to-voltage converter in the second pixel circuit after resetting the first charge-to-voltage converter in the second pixel circuit, wherein:
the first pixel circuit is arranged in an mth row and an nth column of the pixel array, m and n being positive integers; and
the second pixel circuit is arranged in an (m+1)th row and the nth column of the pixel array.

11. The imaging system of claim 1, wherein the first charge-to-voltage converter is a capacitor.

12. The imaging system of claim 1, wherein the constant bias voltage is zero.

13. An imaging method, comprising:
operating an operational amplifier in a high power state with high bias current flowing through an internal circuit of the operational amplifier during a reset period or a readout period of a photodiode so as to output an output signal and provide a constant bias voltage across the photodiode;

resetting a first charge-to-voltage converter during a reset period and prior to an image acquisition period;

acquiring a reset level sample associated with charges accumulated in the first charge-to-voltage converter during the reset period;

operating the operational amplifier in a low power state with low bias current flowing through the internal circuit of the operational amplifier during the image acquisition period of the photodiode so as to drain charges generated by the photodiode in response to light or radiation and provide a constant bias voltage across the photodiode;

accumulating the charges drained from the photodiode in the first charge-to-voltage converter and converting the accumulated charges into a corresponding output voltage during the image acquisition period;

acquiring a signal sample by reading the output voltage during the readout period subsequent to the image acquisition period, wherein a signal sample voltage is associated with the charges accumulated in the first charge-to-voltage converter during the image acquisition period; and generating a digital correlated signal sample for the charge of the photodiode using a difference between a digital signal sample and a digital reset level sample.

14. The imaging method of claim 13, further comprising:
converting the reset level sample, using an A/D converter, to the digital reset level sample;
storing the digital reset level sample before acquiring the signal sample and generating the digital signal sample; and
converting the signal sample, using the A/D converter, to the digital signal sample.

15. The imaging method of claim 13, further comprising:
generating a video signal for a pixel array from the digital correlated signal sample of the photodiode.

16. An imaging system, comprising:
means for operating an operational amplifier in a low power state with low bias current flowing through an internal circuit of the operational amplifier during an image acquisition period of a photodiode so as to drain charges generated by the photodiode in response to light or radiation and provide a constant bias voltage across the photodiode;

means for operating the operational amplifier in a high power state with high bias current flowing through the internal circuit of the operational amplifier during a reset period or a readout period of the photodiode so as to generate an output signal and provide the constant bias voltage across the photodiode;

means for accumulating the charges drained from the photodiode and converting the accumulated charges into the corresponding output voltage during the image acquisition period; and means for acquiring a signal sample by reading the output voltage during the readout period subsequent to the image acquisition period, wherein the signal sample voltage is associated with the charges accumulated by the means for accumulating the charges during the image acquisition period;

means for resetting the means for accumulating the charges during the reset period and prior to the image acquisition period;

means for acquiring a reset level sample associated with charges accumulated in the means for accumulating the charges during the reset period; and means for generating a digital correlated signal sample for the charge of the photodiode using a difference between a digital value of the signal sample and a digital value of the reset level sample.

17. The imaging system of claim 16, wherein the means for generating a digital correlated signal sample, further comprises:
means for storing the digital value of the reset level sample before acquiring the signal sample and generating the digital value of the signal sample.

18. The imaging system of claim 16, wherein the means for generating a digital correlated signal sample, further comprises:
means for converting the signal sample to the digital signal sample and the reset level sample to the digital reset level sample for each pixel circuit.

19. The imaging system of claim 16, further comprising:
means for generating a video signal for a pixel array from the digital correlated signal sample of the photodiode.

* * * * *